US012601448B2

(12) United States Patent
Wang

(10) Patent No.: US 12,601,448 B2
(45) Date of Patent: Apr. 14, 2026

(54) MOBILE TERMINAL PROTECTIVE HOLDER

(71) Applicant: Shenzhen Taersen Technology Co., Ltd., Shenzhen (CN)

(72) Inventor: Shubo Wang, Shenzhen (CN)

( * ) Notice: Subject to any disclaimer, the term of this patent is extended or adjusted under 35 U.S.C. 154(b) by 0 days.

(21) Appl. No.: 18/800,723

(22) Filed: Aug. 12, 2024

(65) Prior Publication Data

US 2026/0041210 A1     Feb. 12, 2026

(51) Int. Cl.
*F16M 13/00*     (2006.01)
*A45C 11/00*     (2006.01)
*A45C 15/06*     (2006.01)

(52) U.S. Cl.
CPC ........... *F16M 13/005* (2013.01); *A45C 11/00* (2013.01); *A45C 15/06* (2013.01); *A45C 11/002* (2025.01); *A45C 11/003* (2025.01); *A45C 2200/15* (2013.01)

(58) Field of Classification Search
CPC ..... F16M 13/005; A45C 11/00; A45C 11/002; A45C 11/003; A45C 15/06; A45C 2200/15; G01D 5/145
USPC .......................................... D4/440; D14/440
See application file for complete search history.

(56) References Cited

U.S. PATENT DOCUMENTS

| | | | | | |
|---|---|---|---|---|---|
| 7,468,603 | B2 * | 12/2008 | Kang | .................... | G06F 3/0362 |
| | | | | | 324/207.2 |
| 8,282,060 | B2 * | 10/2012 | Fan | .................... | F16M 11/041 |
| | | | | | 361/679.21 |

| | | | | | |
|---|---|---|---|---|---|
| 8,690,210 | B1 * | 4/2014 | May | .................... | A45F 5/00 |
| | | | | | 224/217 |
| 8,978,883 | B2 * | 3/2015 | Gandhi | .................... | A45C 11/00 |
| | | | | | 206/45.24 |
| 9,267,642 | B2 * | 2/2016 | Enkerlin | ............. | F16M 11/105 |
| 9,316,344 | B2 * | 4/2016 | Le Gette | ............... | F16M 13/02 |
| 9,930,943 | B2 * | 4/2018 | Lach | .................... | A45F 5/00 |
| 9,980,543 | B2 * | 5/2018 | Ma | .................... | A45C 13/1069 |
| 10,784,914 | B1 * | 9/2020 | Kim | .................... | H04B 1/3888 |
| D898,036 | S * | 10/2020 | Cheng | .................... | D14/440 |
| D906,337 | S * | 12/2020 | Cheng | .................... | D14/440 |
| D949,153 | S * | 4/2022 | Chen | .................... | D14/440 |
| D964,991 | S * | 9/2022 | Xu | .................... | D14/440 |
| D967,831 | S * | 10/2022 | Zeng | .................... | D14/440 |
| D971,924 | S * | 12/2022 | Zhou | .................... | D14/440 |
| D981,418 | S * | 3/2023 | Lin | .................... | D14/440 |
| D985,000 | S * | 5/2023 | Cheng | .................... | D14/440 |

(Continued)

FOREIGN PATENT DOCUMENTS

CN           219553495 U   *   8/2023

*Primary Examiner* — Jonathan Liu
*Assistant Examiner* — Guang H Guan
(74) *Attorney, Agent, or Firm* — Daniel M. Cohn; Howard M. Cohn

(57)           ABSTRACT

A mobile terminal protective holder includes a shell body, a supporting plate, a supporting frame, an angle limiter, and a circuit board. Electronic products such as mobile terminals are arranged in an accommodating cavity of the shell body, and the supporting frame is rotatable with the supporting plate around an axis. A Hall switch and a light emitting member are provided on the circuit board. A magnetic member is provided on the supporting plate. When the supporting plate rotates, the magnetic member approaches or moves away from the Hall switch, thereby controlling the connection and disconnection of the Hall switch.

12 Claims, 11 Drawing Sheets

(56) References Cited

U.S. PATENT DOCUMENTS

| | | | | |
|---|---|---|---|---|
| 11,658,694 B1 * | 5/2023 | Wang | .................. | H04B 1/3877 |
| | | | | 455/575.8 |
| 11,733,736 B1 * | 8/2023 | Wang | .................. | G06F 1/1681 |
| | | | | 455/575.3 |
| D999,769 S * | 9/2023 | Pan | ............................. | D14/440 |
| D999,770 S * | 9/2023 | Pan | ............................. | D14/440 |
| 11,815,950 B2 * | 11/2023 | Ma | ........................... | A45F 5/00 |
| 11,841,747 B2 * | 12/2023 | Lin | ....................... | G06F 1/1656 |
| D1,015,335 S * | 2/2024 | Cheng | ......................... | D14/440 |
| 11,892,876 B1 * | 2/2024 | Lynch | ................. | G06F 1/1632 |
| 11,906,102 B2 * | 2/2024 | Lin | ....................... | F16M 11/38 |
| D1,016,820 S * | 3/2024 | Lin | ............................. | D14/440 |
| D1,023,012 S * | 4/2024 | Lin | ............................. | D14/440 |
| D1,042,467 S * | 9/2024 | Guo | ............................ | D14/440 |
| D1,043,700 S * | 9/2024 | Cheng | ......................... | D14/440 |
| 12,089,727 B2 * | 9/2024 | Liu | ........................... | A45F 5/10 |
| 12,114,746 B2 * | 10/2024 | Lin | ....................... | A45C 11/00 |
| D1,051,910 S * | 11/2024 | Zhong | ......................... | D14/440 |
| D1,054,426 S * | 12/2024 | Cheng | ......................... | D14/440 |
| 12,171,315 B2 * | 12/2024 | Lin | ....................... | A45C 11/00 |
| D1,062,745 S * | 2/2025 | Wu | ............................. | D14/440 |
| D1,067,916 S * | 3/2025 | Xu | ............................. | D14/440 |
| 12,251,010 B2 * | 3/2025 | Carnevali | .............. | A45C 11/00 |
| D1,068,781 S * | 4/2025 | Cheng | ......................... | D14/126 |
| 12,313,216 B2 * | 5/2025 | Wang | .................. | F16M 11/10 |
| D1,087,972 S * | 8/2025 | Cheng | ......................... | D14/440 |
| D1,112,230 S * | 2/2026 | Lin | ............................. | D14/440 |
| 2007/0228261 A1 * | 10/2007 | Kang | .................... | H01H 9/182 |
| | | | | 250/221 |
| 2012/0145843 A1 * | 6/2012 | Ho | ...................... | F16M 11/041 |
| | | | | 248/176.3 |
| 2021/0227960 A1 * | 7/2021 | Carnevali | ................. | A45F 5/10 |
| 2026/0041210 A1 * | 2/2026 | Wang | .................... | A45C 11/00 |

* cited by examiner

MOBILE TERMINAL PROTECTIVE HOLDER

TECHNICAL FIELD

The present disclosure relates to a technical field of electronic product accessories, and in particular to a mobile terminal protective holder.

BACKGROUND

With the upgrading of digital products, mobile terminal devices such as tablet computers continue to become a part of people's lives.

Due to the limitations in the design of tablet computers, users need to use a stand for long-term use. At present, many protective shell structures have been introduced, which can also play a role of temporary supporting while protecting mobile terminals such as tablet computers.

However, the current protective shell has a limited supporting angle for the tablet computers and has poor aesthetics, thereby limiting the use of the tablet computers.

SUMMARY

The present disclosure provides a mobile terminal protective holder, aiming to solve the problem that the existing protective shell has limitations in the use of the mobile terminal and has poor aesthetics.

In order to realize the above purpose, the present disclosure provides the mobile terminal protective holder, comprising: a shell body, a supporting plate, a supporting frame, an angle limiter, and a circuit board.

The shell body is provided with an accommodating cavity for accommodating the mobile terminal, and the bottom of the accommodating cavity is provided with a through hole penetrating the bottom of the accommodating cavity; the supporting plate is arranged at the through hole, and the supporting plate is rotated about the axis relative to the shell body around the center point of the through hole; one end of the supporting frame is hinged to the supporting plate, and the other end is opened and closed relative to the supporting plate; the angle limiter is fixed at the through hole and located on the outer peripheral side of the supporting plate, and the angle limiter is used to limit the rotation angle of the supporting plate; a circuit board, wherein the circuit board is arranged on a side of the angle limiter away from the accommodating cavity, the circuit board is provided with a Hall switch, and a surface of the circuit board facing away from the accommodating cavity is provided. with a light emitting member, the light emitting member is electrically connected to the Hall switch. When the supporting plate rotates, the magnetic member approaches or moves away from the Hall switch, so that the Hall switch is turned on or off. The Hall switch is used to control the light emitting member to be powered on or off.

The mobile terminal protective holder provided by the present disclosure has beneficial effects as follows.

The mobile terminal protective holder, comprising: the shell body, the supporting plate, the supporting frame, the angle limiter and the circuit board. Electronic products such as mobile terminals are arranged in the accommodating cavity of the shell body, the supporting frame is rotated with the supporting plate around the axis, that is, a 360° supporting angle is obtained, which is adapted to more supporting angles and supporting scenarios. Furthermore, the angle limiter is located at the circumferential side wall of the supporting plate, which is used to limit the rotation angle of the supporting plate, that is, to maintain the rotation angle of the supporting plate relative to the shell body, that is, to maintain the rotation angle between the supporting frame and the shell body. In addition, the Hall switch and the light emitting member are provided on the circuit board, the magnetic member is provided on the supporting plate. When the supporting plate rotates, the magnetic member approaches or moves away from the Hall switch, thereby controlling the connection and disconnection of the Hall switch. The Hall switch can control the power on and off of the light emitting member, so that the light emitting member can emit light while the supporting frame is rotating, which is more aesthetically pleasing. In summary, the mobile terminal protective holder is adapted to more usage scenarios, which is less limited, more aesthetically pleasing and more convenient to use.

In one embodiment, the bottom of the accommodating cavity is also provided with a battery accommodating groove, a battery is provided in the battery accommodating groove, the battery is electrically connected to the circuit board.

In one embodiment, the back of the shell body is also provided with a light-transmitting protective cover, and the light-transmitting protective cover is covered on the circuit board.

In one embodiment, it also comprises an inner cover plate. The inner cover plate is provided on the inner side of the bottom of the accommodating cavity and is used for plugging the through hole.

In one embodiment, the angle limiter comprises a plurality of limiting bodies provided along the circumferential direction of the supporting plate and connecting arms. Each of the connecting arms is connected between corresponding two adjacent limiting bodies. The plurality of limiting bodies are fixedly connected to the shell body, and the connecting arms abut against the circumferential side wall of the supporting plate.

In one embodiment, convex parts are one-to-one provided on the connecting arms; concave parts adapted to the convex parts are provided on the circumferential side wall of the supporting plate. When the supporting plate rotates around the axis, each of the convex parts is alternately placed in a corresponding one of theconcave parts.

In one embodiment, the angle limiter comprises a plurality of tooth structures which are provided on the shell body, and groove structures adapted to the tooth structures are formed on the circumferential side wall of the supporting plate.

In one embodiment, the supporting frame comprises a first supporting plank, the supporting plate is provided with a first accommodating groove for accommodating the first supporting plank, and the end surface of the first supporting plank is flush with the end surface of the supporting plate, and one end of the first supporting plank is hinged to the side wall of the first accommodating groove.

In one embodiment, the other end of the first supporting plank is provided with a first notch, the side wall of the first accommodating groove is concave inward to form a second notch; and the second notch is corresponded to the first notch, the first supporting plate is also provided with a third notch adjacent to the first notch.

In one embodiment, the supporting frame also comprises a second supporting plank, and a side of the first supporting plank facing the supporting plate is inwardly concave to form a second accommodating groove; one end of the second supporting plank is hinged to the side wall of the second accommodating groove and the other end is slidably connected to the supporting plate, and the opening and closing direction of the second supporting plank is opposite to the opening and closing direction of the first supporting plank.

In one embodiment, the bottom of the first accommodating groove is provided with a strip-shaped hole, and a baffle plate is also provided at the bottom of the first accommodating groove; the baffle plate is extended along the opening and closing direction of the strip-shaped hole and blocks part of the strip-shaped hole. One end of the first supporting plank is provided with a connecting ear, and the connecting ear is extended into the strip-shaped hole and is clip-connecting to the baffle plate; wherein the connecting ears slide within the strip-shaped hole to limit an opening and closing angle of the first supporting plank.

In one embodiment, a block is provided at the bottom of the first accommodating groove, and the block is used to maintain the maximum opening and closing angle of the first supporting plank.

In one embodiment, the shell body comprises a lower protective cover, an upper protective cover fastened to the lower protective cover, and the lower protective cover is provided with the through hole.

In one embodiment, a stylus pen installation portion is also provided on the back side of the shell body, and a stylus pen is movably arranged in the stylus pen installation portion.

In one embodiment, the supporting plate is also provided with a rope threading hole.

BRIEF DESCRIPTION OF DRAWINGS

In order to more clearly illustrate technical solutions in embodiments of the present disclosure, drawings required in description or prior art are briefly introduced below, and obviously, the drawings in the following description are merely some embodiments of the present disclosure. For a person having ordinary skill in art, other drawings may be obtained according to the drawings without creative efforts.

Figure 1:
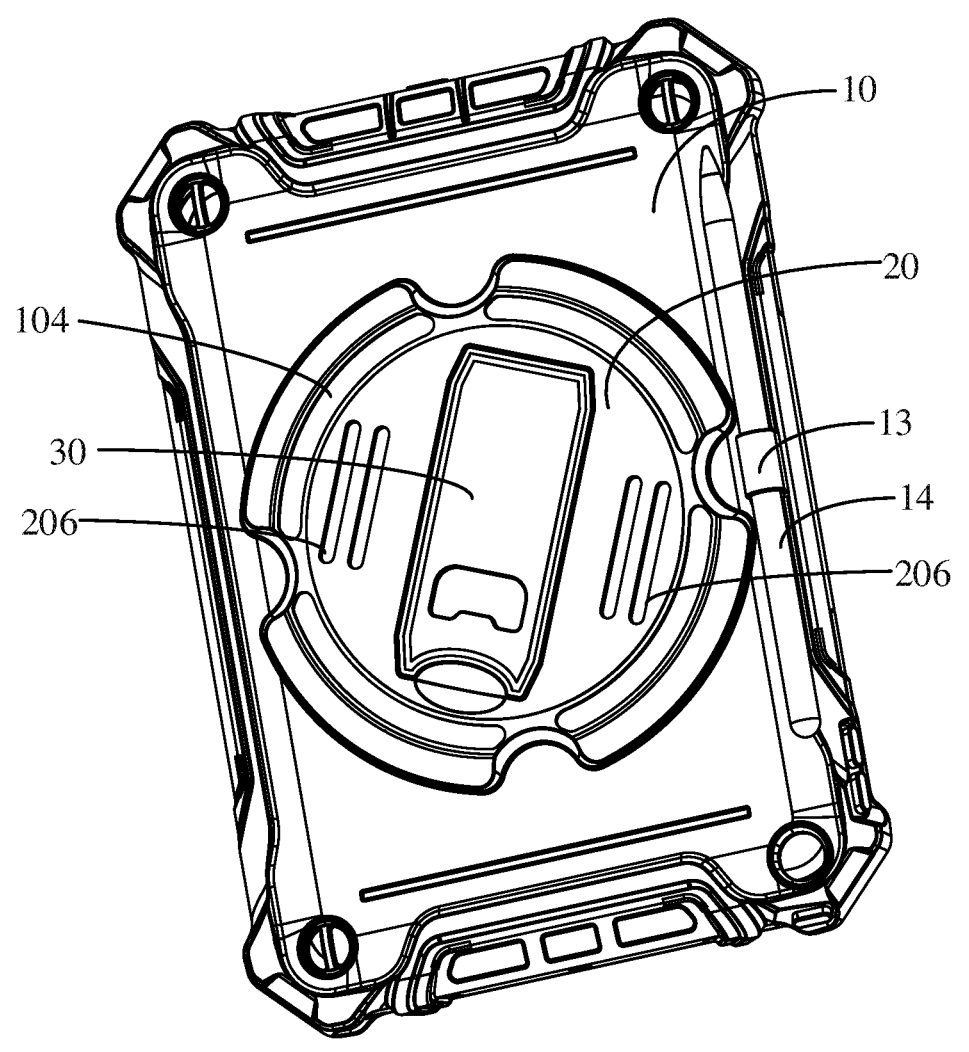
FIG. 1 is a schematic structural diagram of a supporting plate of a mobile terminal protective holder in a closed state.

Reference number in the drawings:

| | | | |
|---|---|---|---|
| shell body | 10 | accommodating cavity | 101 |
| through hole | 102 | battery accommodating groove | 103 |
| lower protective cover | 11 | upper protective cover | 12 |
| supporting plate | 20 | magnetic member | 201 |
| first accommodating groove | 203 | second notch | 204 |
| strip-shaped hole | 205 | concave part | 202 |
| baffle plate | 21 | block | 22 |
| rope threading hole | 206 | supporting frame | 30 |
| first supporting plank | 31 | first notch | 301 |
| third notch | 302 | second supporting plank | 32 |
| second accommodating groove | 303 | angle limiter | 40 |
| limiting body | 41 | connecting arm | 42 |
| convex part | 421 | circuit board | 50 |
| Hall switch | 501 | light emitting member | 502 |
| inner cover plate | 60 | light-transmitting protective cover | 104 |

DETAILED DESCRIPTION

The following describes in detail the embodiments of the present disclosure, examples of which are illustrated in the accompanying drawings, wherein the same or similar reference numerals refer to the same or similar elements or elements having the same or similar functions throughout. The embodiments described below with reference to the accompanying drawings are exemplary, and are not intended to limit the present disclosure.

In the description of the present disclosure, it should be understood that orientation or positional relationship indicated by terms "length", "width", "upper", "lower", "front", "rear", "left", "right", "vertical", "horizontal", "top", "bottom", "inner", "outer" and so on are based on the orientation or positional relationship shown in the drawings, rather than indicating or implying that an indicated device or an indicated element must have a particular orientation, are constructed and operated in a particular orientation, and are therefore not to be construed as limiting the present disclosure.

In addition, terms such as "first" and "second" are only used for the purpose of description, rather than being understood to indicate or imply relative importance or hint the number of indicated technical features. Thus, the feature limited by "first" and "second" can explicitly or implicitly include at least one feature. In the description of the present disclosure, the meaning of "a plurality of" is at least two, unless otherwise specified.

In the present disclosure, the terms such as "mounting", "connected", "connected to", "fixed at", and the others should be understood in a broad sense unless expressly stated or limited otherwise; for example, it may be a fixed connection or a detachable connection, or integrated; it can be a mechanical connection or an electrical connection; it can be a direct connection or an indirect connection through an intermediate medium, and it can be the internal connection of the two elements or the interaction relationship between the two elements. For a person having ordinary skill in art, the specific meanings of the above terms in the present invention can be understood according to specific situations.

Referring to FIG. 1 to FIG. 6, the mobile terminal protective holder provided by the embodiment of the present disclosure can be used to protect touch-screen mobile terminals such as tablet computers and mobile phones.

The mobile terminal protective holder comprises a shell body 10, a supporting plate 20, a supporting frame 30, an angle limiter 40 and a circuit board 50.

Specifically, the shell body 10 is provided with an accommodating cavity 101 for accommodating the mobile terminal, and the bottom of the accommodating cavity 101 is provided with a through hole 102 penetrating the bottom of the accommodating cavity 101; the supporting plate 20 is arranged at the through hole 102 and can rotate relative to the shell body 10 around the center point of the through hole 102, a magnetic member 201 is arranged around the edge of the supporting plate 20; one end of the supporting frame 30 is hinged to the supporting plate 20, and the other end of the supporting frame 30 can be opened and closed relative to the supporting plate 20; the angle limiter 40 is fixed at the through hole 102 and located on the outer peripheral side of the supporting plate 20, the angle limiter 40 is used to limit the rotation angle of the supporting plate 20; the circuit board 50 is arranged on a side of the angle limiter 40 away from the accommodating cavity 101, the circuit board 50 is provided with a Hall switch 501, and a surface of the circuit board 50 facing away from the accommodating cavity 101 is provided with a light emitting member 502, the light emitting member 502 is electrically connected to the Hall switch 501. When the supporting plate 20 rotates, the magnetic member 201 approaches or moves away from the Hall switch 501, so that the Hall switch 501 is turned on or off. The Hall switch 501 is used to control the light emitting member 502 to be powered on or off. At the same time, the supporting frame 30 is rotated about the axis with the supporting plate 20 to obtain a 360° rotation angle, which can not only satisfy the horizontal screen placement and vertical placement of the mobile terminal, but also be suitable for use scenarios with other angles. The function of the angle limiter 40 is to maintain the rotation angle of the supporting plate 20 and the shell body 10, that is, to maintain the rotation angle of the supporting frame 30 and the shell body 10.

As an example, the angle limiter 40 can be a closed annular structure, the inner wall of which abuts against the circumferential side wall of the supporting plate 20 and limits the rotation angle of the supporting plate 20 relative to the shell body 10. For example, at least one of the inner wall of the annular structure and the circumferential side wall of the supporting plate 20 is provided with a non-slip layer with a high frictional coefficient, that is, the rotation angle is actually limited by the frictional force between the two. Or the inner wall of the annular structure and the circumferential side wall of the supporting plate 20 are provided with mutually matching convex and concave structures, and the current rotation angle of the supporting plate 20 is limited when the convex structures are snapped into the corresponding concave structures.

As an example, the angle limiter 40 can also be a non-closed structure. In this case, the angle limiter 40 is a plurality of independent structures, each one of which directly abuts against the circumferential side wall of the supporting plate 20, and limits the rotation angle of the supporting plate 20 relative to the shell body 10. For example, the independent structures are elastic protrusions provided on the shell body 10. The elastic protrusion is a mater material that is easily deformed, such as rubber, which can satisfy the rotation of the supporting plate 20 relative to the shell body 10 around the axis, and at the same time, can abut against the circumferential side walls of the supporting plate 10 so as to achieve the angle limitation.

In addition, the structural form of the supporting frame 30 is not limited as long as it can support the shell body 10. For example, the supporting frame 30 can be a traditional plate-like structure, or can be a tripod structure or the like.

The present disclosure provides the mobile terminal protective holder, comprising: the shell body 10, the supporting plate 20, the supporting frame 30, the angle limiter 40, and the circuit board 50; and electronic products such as mobile terminals are arranged in the accommodating cavity 101 of the shell body 10, the supporting frame 30 is rotated with the supporting plate 20 around the axis, that is, a 360° supporting angle is obtained, which is adapted to more supporting angles and supporting scenarios. Furthermore, the angle limiter 40 is located at the circumferential side wall of the supporting plate 20, which is used to limit the rotation angle of the supporting plate 20, that is, to maintain the rotation angle of the supporting plate 20 relative to the shell body 10, that is, to maintain the relationship between the supporting frame 30 and the shell body 10 rotation angle. In addition, the Hall switch 501 and the light emitting member 502 are provided on the circuit board 50, the magnetic member 201 is provided on the supporting plate 20. When the supporting plate 20 rotates, the magnetic member 201 approaches or moves away from the Hall switch 501, thereby controlling the connection and disconnection of the Hall switch 501. The Hall switch 501 can control the power on and off of the light emitting member 502, so that the light emitting member 502 can emit light while the supporting frame 30 is rotating, which is more aesthetically pleasing. In summary, the mobile terminal protective holder is adapted to more usage scenarios, which is less limited, more aesthetically pleasing and more convenient to use.

Figure 3:
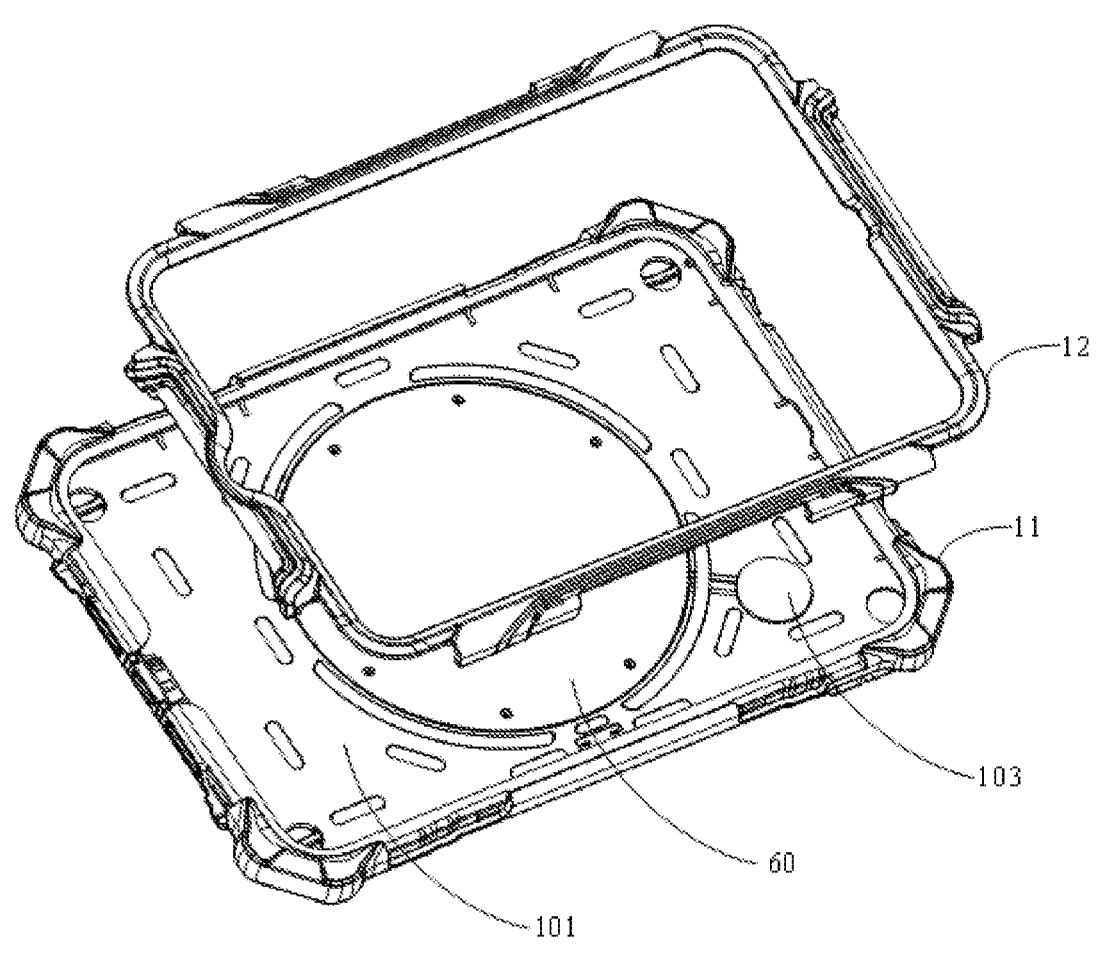
FIG. 3 is an exploded view of the mobile terminal protective holder according to an embodiment of the present disclosure.

Referring to FIG. 3, in one embodiment, the bottom of the accommodating cavity 101 is also provided with a battery accommodating groove 103, a battery is provided in the battery accommodating groove 103, the battery is electrically connected to the circuit board 50. Specifically, the battery is used to supply power to the light emitting member 502. When the battery is accommodated in the battery accommodating groove 103, the top surface of the battery is flush with the bottom surface of the accommodating cavity 101, thereby preventing the battery from protruding and causing the mobile terminal in the accommodating cavity 101 to be unstable.

Referring to FIG. 1, in one embodiment, the back of the shell body 10 is also provided with a light-transmitting protective cover 104, and the light-transmitting protective cover 104 is covered on the circuit board 50. Specifically, the light-transmitting protective cover 104 is used to protect the circuit board 50 and the light emitting member 502, etc. By setting it as the light-transmitting protective cover 104, the light emitted by the light emitting member 502 on the circuit board 50 can be irradiated to the outside.

Figure 4:
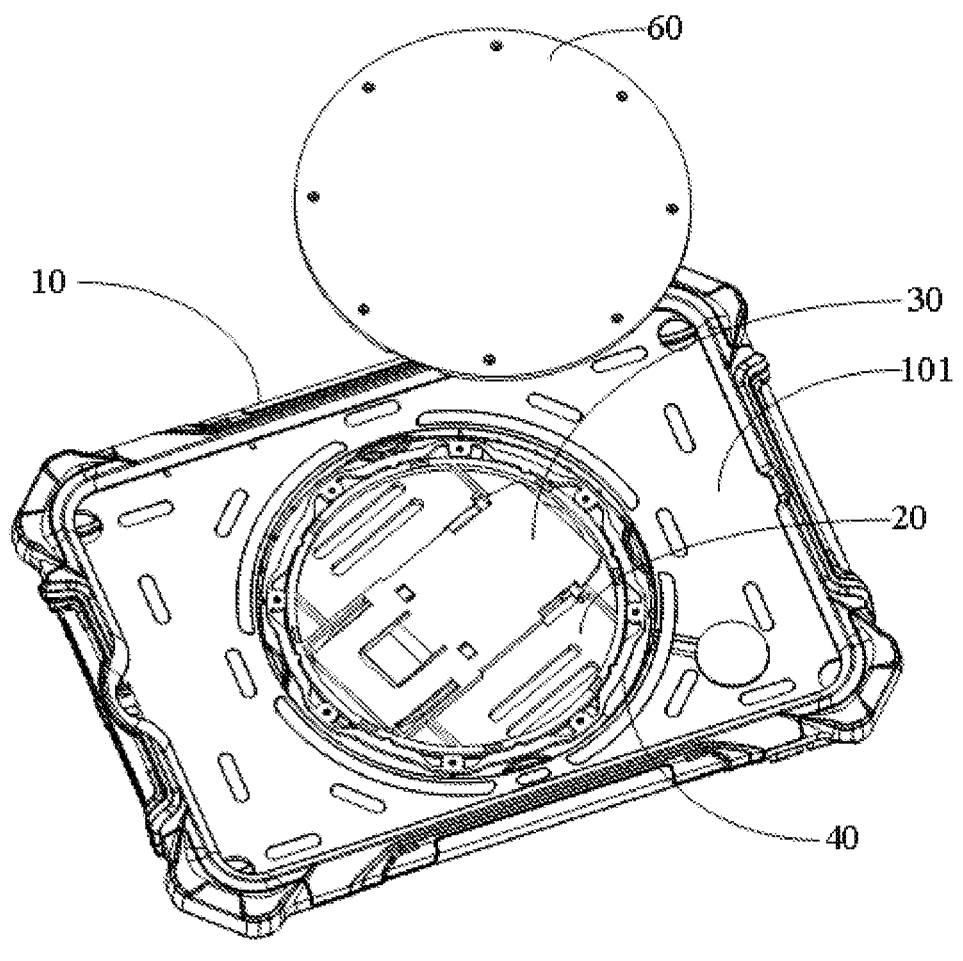
FIG. 4 is an exploded view of the mobile terminal protective holder according to an embodiment of the present disclosure from another angle.
Figure 5:
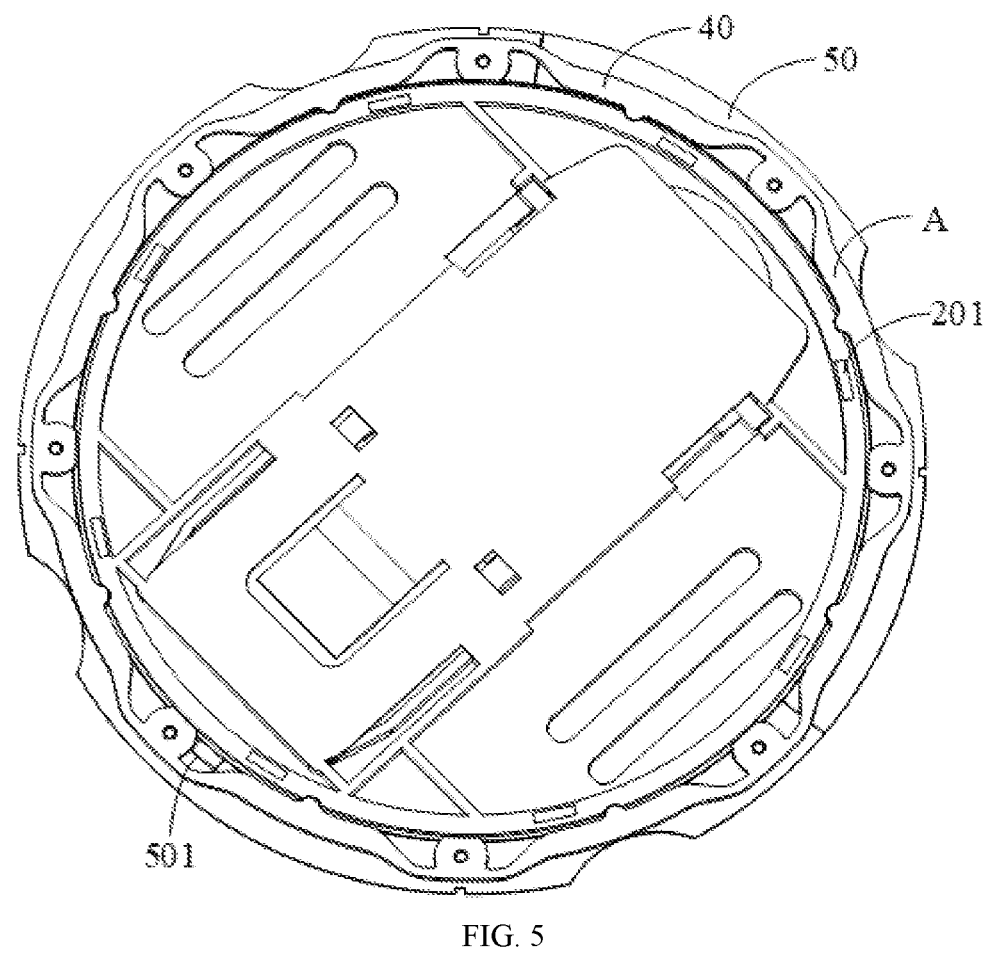
FIG. 5 is a schematic structural diagram of a supporting frame, a supporting plate and an angle limiter of the mobile terminal protective holder according to an embodiment of the present disclosure.

Referring to FIG. 4, in one embodiment, the mobile terminal protective holder comprises an inner cover plate 60, the inner cover plate 60 is provided on the inner side of the bottom of the accommodating cavity 101 and is used for plugging the through hole 102. Specifically, it can be understood that after the inner cover plate 60 blocks the through hole 102, the inner side of the bottom of the shell body 10 and the inner side of the inner cover plate 60 together form an end surface for supporting the mobile terminal. In this way, no matter how the supporting plate 20 rotates around the axis, the mobile terminal in the accommodating cavity 101 will not be scratched, that is, the terminal product is protected. At the same time, the supporting frame 30 is rotated about the axis with the supporting plate 20 to obtain a 360° rotation angle, which can not only satisfy the horizontal screen placement and vertical placement of the mobile terminal, but also be suitable for use scenarios with other angles. The function of the angle limiter 40 is to maintain the rotation angle of the supporting plate 20 and the shell body 10, that is, to maintain the rotation angle of the supporting frame 30 and the shell body 10.

Figure 8:
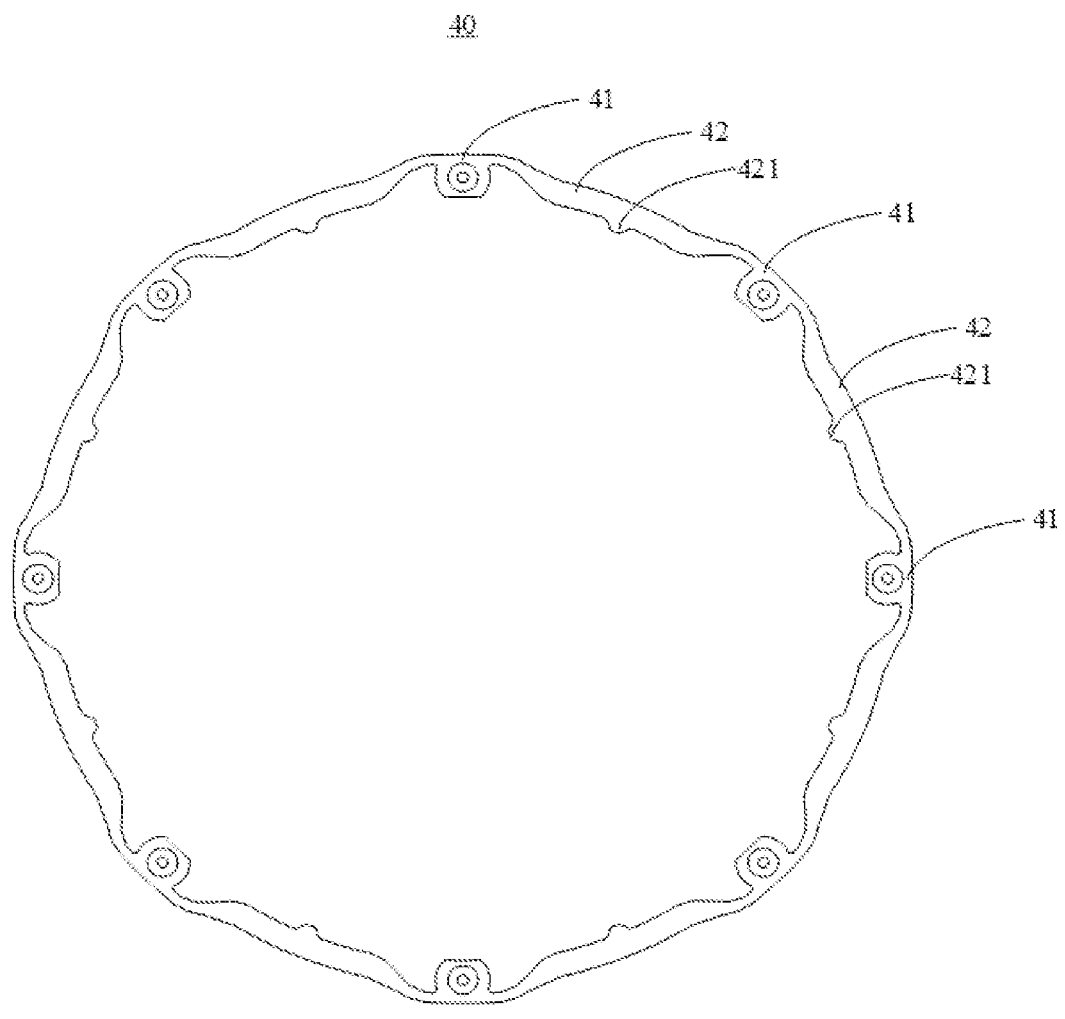
FIG. 8 is a schematic structural diagram of an angle limiter of the mobile terminal protective holder according to an embodiment of the present disclosure.

Referring to FIG. 8, in one embodiment, the angle limiter 40 comprises a plurality of limiting bodies 41 arranged along the circumferential direction of the supporting plate 20 and connecting arms 42. Each of the connecting arms 42 is connected between each two adjacent limiting bodies 41 of the plurality of limiting bodies 41. The plurality of limiting bodies 41 are fixedly connected to the shell body 10, and the connecting arms 42 abut against the circumferential side wall of the supporting plate 20. It may be understood that the plane of each of the connecting arms 42 between two adjacent limiting bodies 41 are coplanar with the supporting plate 20 so that when the supporting plate 20 is rotated relative to the shell body 10 around the axis, which is acted directly on the circumferential side wall of the supporting plate 20 for the purpose of limiting the angle of rotation.

For example, in terms of structure, there is a notch structure that satisfies the deformation at the connection between the opposite ends of each of the connecting arms 42 and each two adjacent limiting bodies 41, so that the connecting arms 42 are more likely to be deformed in the interaction with the supporting plate 20 to satisfy the purpose of limiting the angle of rotation of the support plate 20.

For example, in terms of material, the material of the connecting arms 42 is easier to deform than the plurality of limiting bodies 41.

Figure 9:
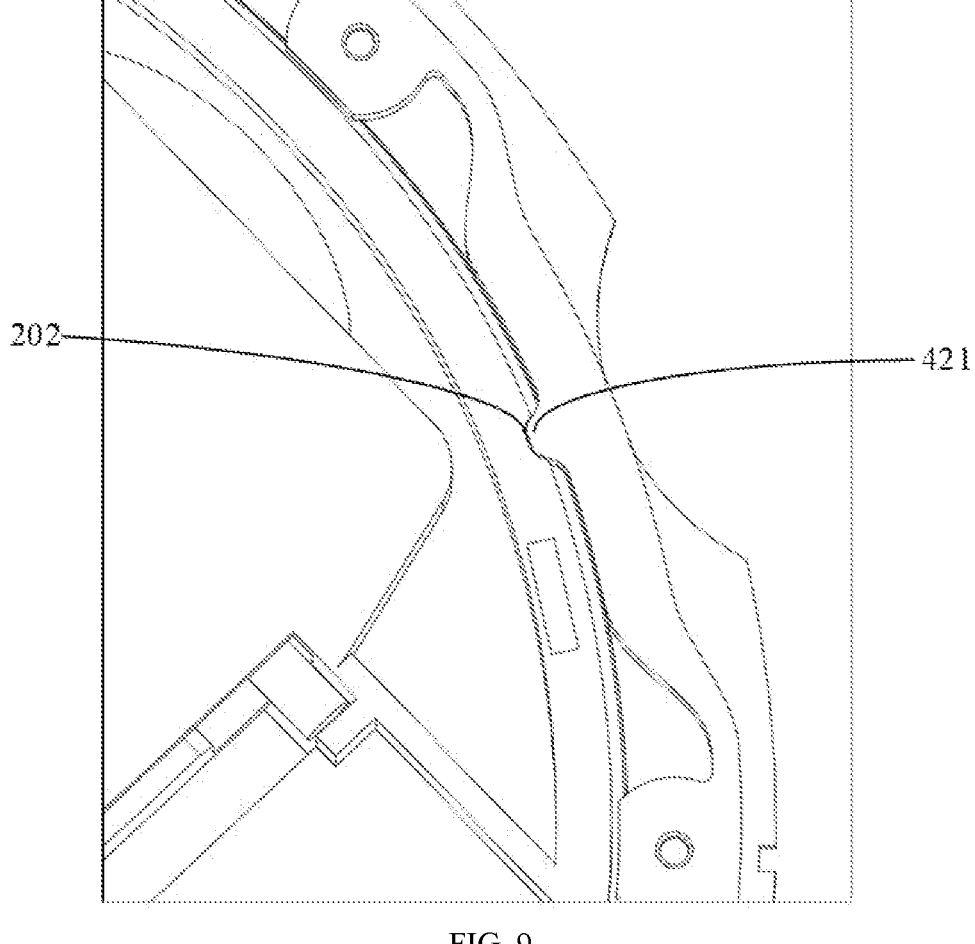
FIG. 9 is the enlarged view of A place in FIG. 5.

Referring to FIG. 9, in one embodiment, convex parts 421 are one-to-one disposed on the connecting arms 42, and the circumferential side wall of the supporting plate 20 is provided with concave parts 202 matched with the convex parts 421. Understandably, during the rotation of the supporting plate 20 relative to the shell body 10, the convex parts 421 on the connecting arms 42 are in contact with the circumferential side wall of the supporting plate 20 to achieve the purpose of damping rotation. When rotated to the preset angle, each of the convex parts 421 is placed in the corresponding one of the concave parts 202. At this time, a "click" can be heard. In this way, the angle limiter 40 is temporarily locked the supporting plate 20, the supporting plate 20 is no longer rotated relative to the shell body 10 until the external force pushes the convex parts 421 to slip out of the concave parts 202, and the supporting plate 20 is rotated relative to the shell body 10 again. Therefore, it is possible to define an angle at which the supporting plate 20 can be rotated each time by providing different numbers of the convex parts 421 and the concave parts 202. It is easy to deduce that the setting positions of the convex parts 421 and the concave parts 202 can be exchanged; alternatively, the connecting arms 42 are provided with both the convex parts 421 and the concave parts 202, and at the same time, the supporting plate 20 is also provided with the concave parts 202 and the convex parts 421 at the corresponding position.

In another embodiment, the angle limiter 40 comprises a plurality of tooth structures which are provided on the shell body 10, and groove structures adapted to the tooth structures are formed on the circumferential side wall of the supporting plate 20. It can be understood that the angle limiter 40 is composed of a plurality of independent structures, each of which is enclosed to form a non-closed angle limiter 40. Similarly, the requirement for damping rotation of the supporting plate 20 is achieved through the adaptation of the tooth structure and the groove structure.

Figure 2:
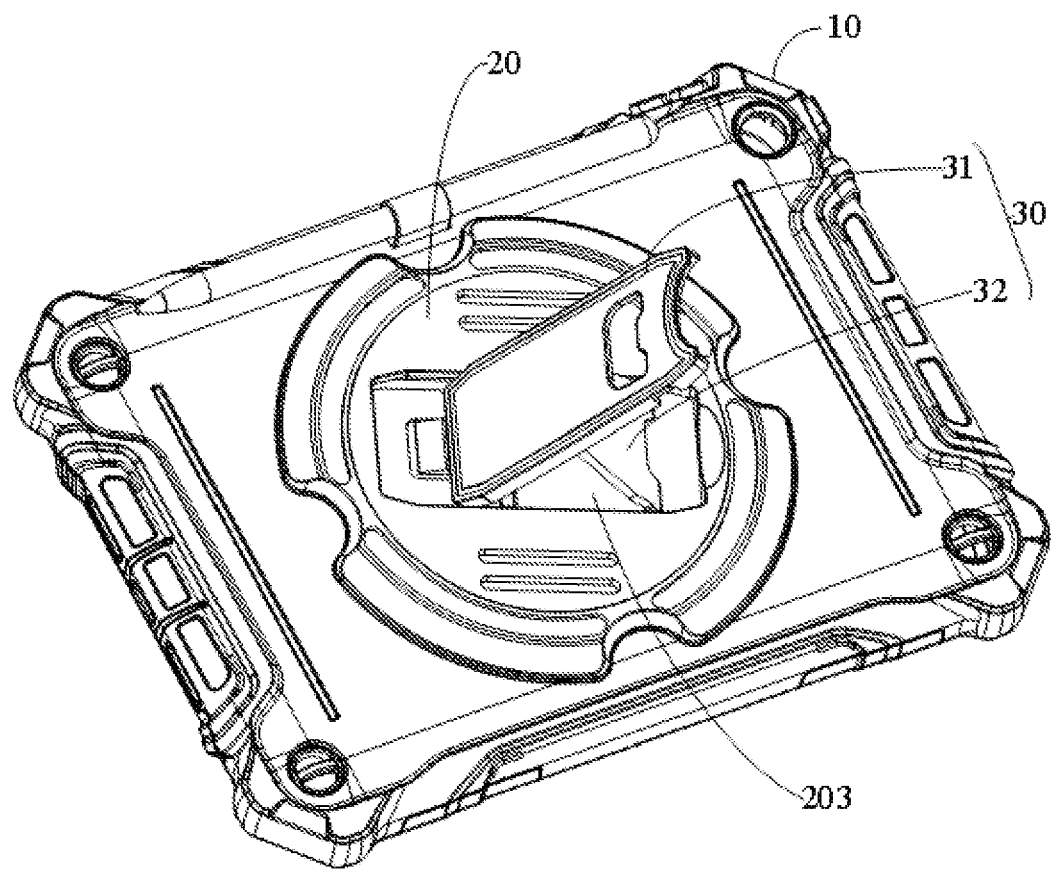
FIG. 2 is a schematic structural diagram of a supporting plate of the mobile terminal protective holder according to an embodiment of the present disclosure in an open state.

Referring to FIG. 2, in one embodiment, the supporting frame 30 comprises a first supporting plank 31, the supporting plate 20 is provided with a first accommodating groove 203 for accommodating the first supporting plank 31, and the end surface of the first supporting plank 31 is flush with the end surface of the supporting plate 20, and one end of the first supporting plank 31 is hinged to the side wall of the first accommodating groove 203. From the perspective of the overall shape and structure, it can be understood that the first supporting plank 31 is well received in the first accommodating groove 203, so that the mobile terminal protective holder is more beautiful as a whole and the volume is smaller. At the same time, the purpose of supporting is achieved through the rotation opening and closing of one end of the first supporting plank 31 relative to the shell body 10.

Figure 6:
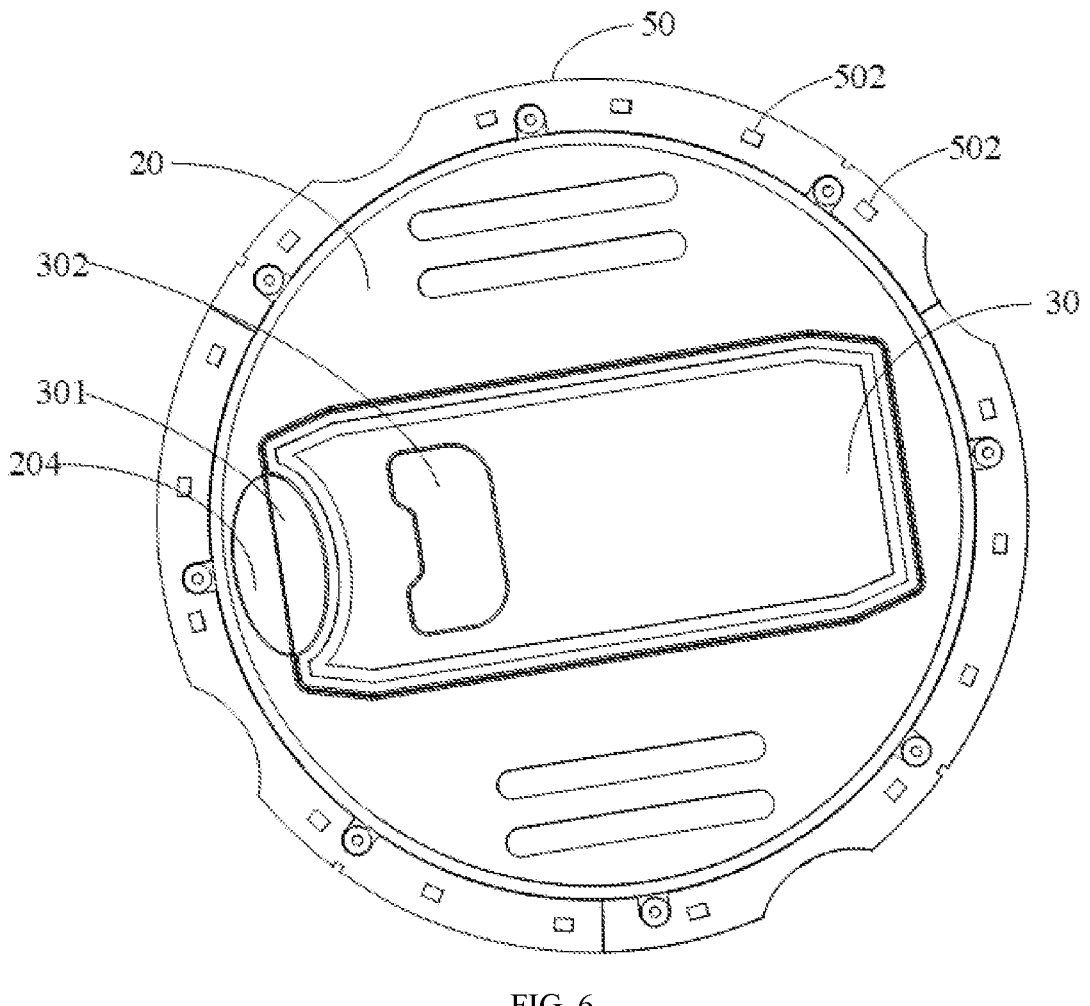
FIG. 6 is a schematic structural diagram of the supporting frame and the supporting plate of the mobile terminal protective holder according to an embodiment of the present disclosure from another angle.
Figure 7:
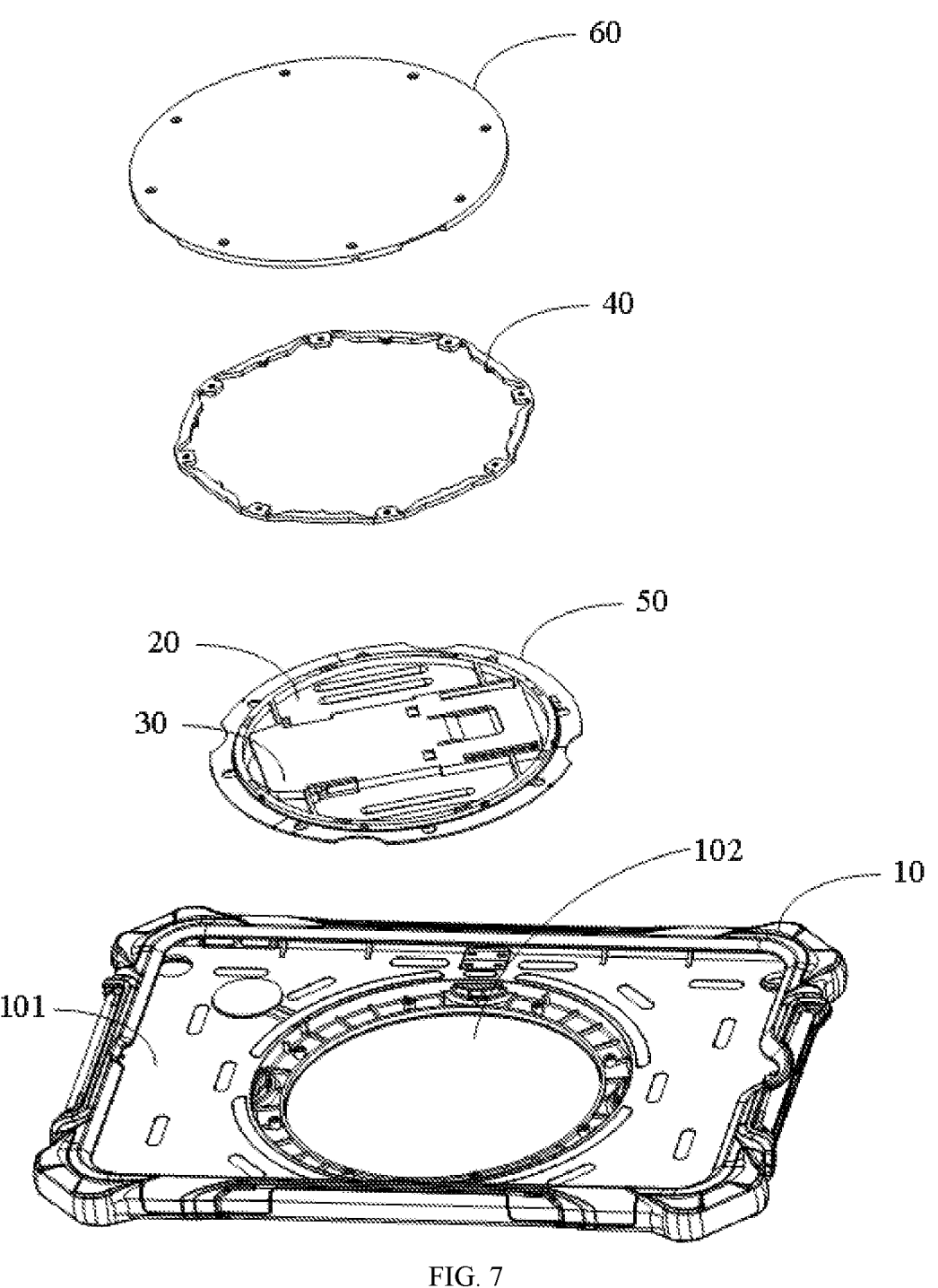
FIG. 7 is an exploded view of the mobile terminal protective holder according to an embodiment of the present disclosure from another angle.

Referring to FIG. 6, in one embodiment, the other end of the first supporting plank 31 is provided with a first notch 301, the side wall of the first accommodating groove 203 is concave inward to form a second notch 204; and the second notch 204 is corresponded to the first notch 301, the first supporting plate 31 is further provided with a third notch 302 adjacent to the first notch 301. It can be understood that the oppositely disposed first notch 301 and the second notch 204 are formed a space for the user's fingers to insert, the third notch 302 is provided so that the user can hold the third notch 302 to exert force better, so as to facilitate the user to take out the first supporting plank 31 from the supporting plate 20.

Figure 10:
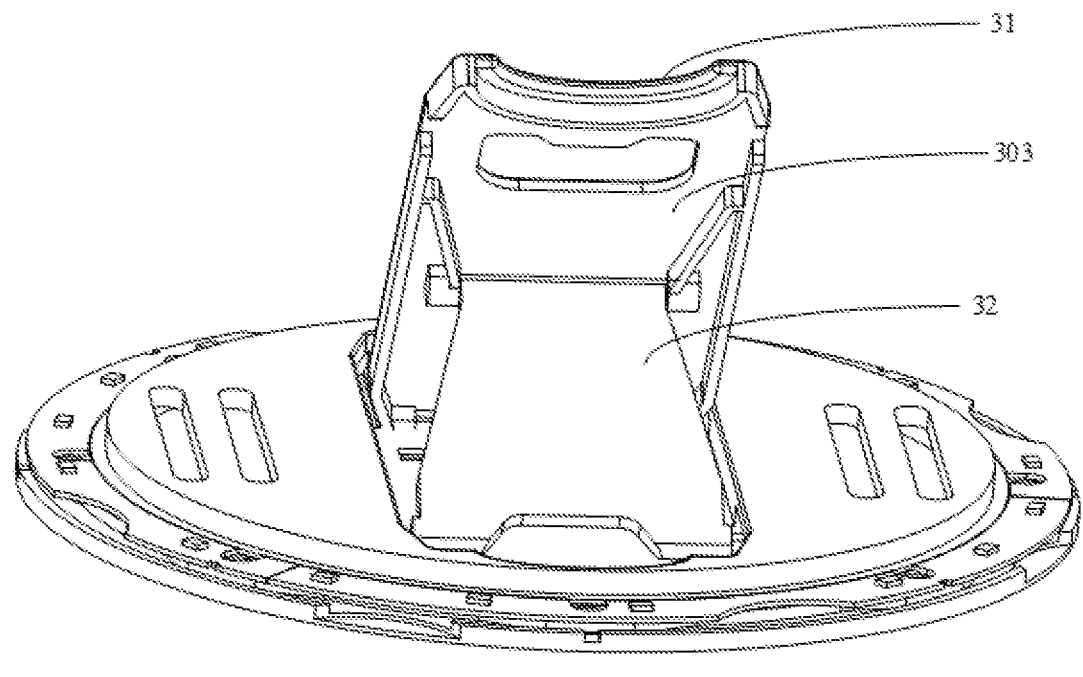
FIG. 10 is a schematic structural diagram of the supporting frame, the supporting plate and the angle limiter of the mobile terminal protective holder according to an embodiment of the present disclosure from another angle.

Referring to FIG. 2 and FIG. 10, in one embodiment, the supporting frame 30 also comprises a second supporting plank 32, and a side of the first supporting plank 31 facing the supporting plate 20 is inwardly concave to form a second accommodating groove 303; one end of the second supporting plank 32 is hinged to the side wall of the second accommodating groove 303 and the other end is slidably connected to the supporting plate 20, and the opening and closing direction of the second supporting plank 32 is opposite to the opening and closing direction of the first supporting plank 31. It can be understood that the function of the second supporting plank 32 is to maintain the opening angle of the first supporting plank 31 relative to the supporting plate 20, that is, the second supporting plank 32 is located between the first supporting plank 31 and the supporting plate 20, and its end away from the first supporting plank 31 is slid relative to the supporting plate 20, thereby gradually separating the first supporting plank 31 from the supporting plate 20. Moreover, the opening angle of the first supporting plank 31 relative to the supporting plate 20 is limited by its own length, and this structural design can ensure that the first supporting plank 31 is more stable and reliable during the supporting process. At the same time, when folded and stored, the second supporting plank 32 is accommodated in the second accommodating groove 303, so as to avoid the increase in the thickness direction of the two due to stacking, that is, the supporting frame 30 is thinner in the thickness direction.

Figure 11:
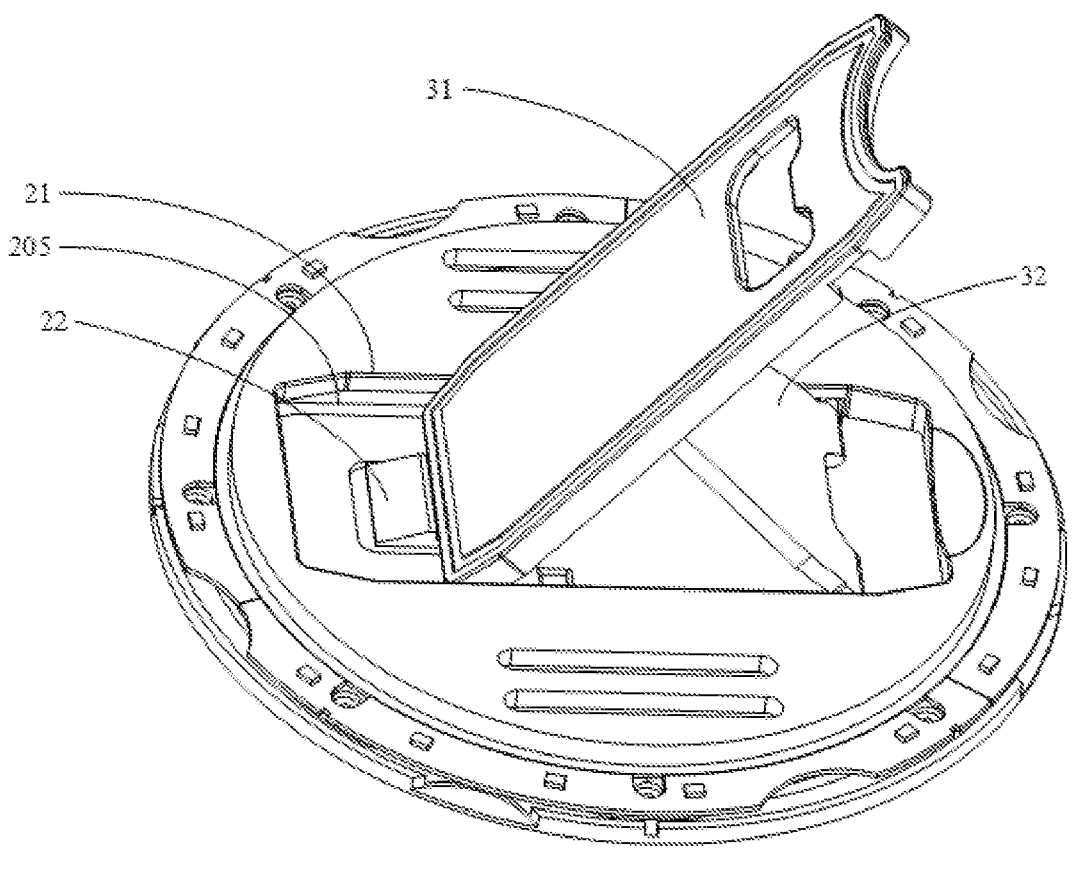
FIG. 11 is a schematic structural diagram of another angle of the supporting frame, the supporting plate and the angle limiter of the mobile terminal protective holder according to an embodiment of the present disclosure from another angle.

Specifically, referring to FIG. 11, the bottom of the first accommodating groove 203 is provided with a strip-shaped hole 205, and a baffle plate 21 is also provided at the bottom of the first accommodating groove 203; the baffle plate 21 is extended along the opening and closing direction of the strip-shaped hole 205 and blocks part of the strip-shaped hole 205. The other end of the second supporting plank 32 is provided with a connecting ear, and the connecting ear is extended into the strip-shaped hole 205 and is clip-connecting to the baffle plate 21.

Wherein, the connecting ear is slid in the strip-shaped hole 205 to define the opening and closing angle of the second supporting plank 32 relative to the first supporting plank 31. Here, the strip-shaped hole 205 is used to limit the sliding track of the connecting ear, that is, the connecting ear can only be slid in the opening direction of the strip-shaped hole 205, and the baffle plate 21 is acted to prevent the connecting ear from coming out off the supporting plate 20.

Preferably, the number of connecting ears is two, which are symmetrically arranged on one end of the second supporting plank 32 away from the first supporting plank 31, and the two strip-shaped holes 205 are spaced apart, and the spacing of the strip-shaped hole 205 is the same as the spacing of the two connecting ears.

Referring to FIG. 11, in one embodiment, a block 22 is provided at the bottom of the first accommodating groove 203, and the block 22 is used to maintain the maximum opening and closing angle of the second supporting plank 32 relative to the first supporting plank 31. It can be understood that when the end of the second supporting plank 32 away from the first supporting plank 31 is guided by the strip-shaped hole 205 and slid relative to the supporting plate 20, it is easy to slide around, and the block 22 can be blocked the second supporting plank 20. The end of the supporting plate 32 is prevented from sliding around.

Preferably, as shown in FIG. 11, the block 22 is a wedge-shaped block 22, which takes the form of a "front low back high" structure in the thickness direction and is located between two strip-shaped holes 205. Thus, when it is desired to open the second supporting plank 32, the second supporting plank 32 can easily pass over the "small tip" of the wedge-shaped block 22, and the second supporting plank 32 is blocked by the "large tip" of the wedge-shaped block 22, thereby preventing the second supporting plank 32 from falling back. When the first supporting plank 31 needs to be retracted, the wedge-shaped block 22 is pressed down manually, and then the first supporting plank 31 returns to its original position.

Referring to FIG. 3, the shell body 10 comprises: a lower protective cover 11, an upper protective cover 12 fastened to the lower protective cover 11, and the lower protective cover 11 is provided with the through hole 102. Understandably, when in use, the upper protective cover 12 is removed from the lower protective cover 11, the mobile terminal is placed in the accommodating space, the upper protective cover 12 is snapped onto the lower protective cover 11.

For example, the upper protective cover 12 is connected to the lower protective cover 11 through a snap structure; alternatively, the upper protective cover 12 may also be connected to the lower protective cover 11 through screws.

Referring to FIG. 1 and FIG. 2, in one embodiment, a stylus pen installation portion 13 is also provided on the back side of the shell body 10, and a stylus pen 14 is movably arranged in the stylus pen installation portion 13. Specifically, the stylus pen 14 can be provided to the user as a handwriting tool, so that the mobile terminal protection bracket has more functions and meets the needs of more users.

Referring to FIG. 1, in one embodiment, the supporting plate 20 is also provided with a rope threading hole 206.

Specifically, the rope threading hole 206 is used to tie a rope, making it convenient for users to carry it with them.

Above are only preferred embodiments of the present disclosure and are not intended to limit the present disclosure. Any modification, equivalent replacement and improvement made within spirit and principle of the present disclosure should be included in protective scope of the present disclosure.

What is claimed is:

1. A mobile terminal protective holder, comprising:
a shell body, wherein the shell body is provided with an accommodating cavity for accommodating a mobile terminal, and a bottom of the accommodating cavity is provided with a through hole penetrating the bottom of the accommodating cavity;
a supporting plate, wherein the supporting plate is arranged at the through hole and is configured to rotate relative to the shell body around a center point of the through hole, a magnetic member is arranged around an edge of the supporting plate;
a supporting frame, wherein a first end of the supporting frame is hinged to the supporting plate, and a second end of the supporting frame is configured to be opened and closed relative to the supporting plate;
an angle limiter, wherein the angle limiter is fixed at the through hole and located on an outer peripheral side of the supporting plate, the angle limiter is used to limit a rotation angle of the supporting plate;
a circuit board, wherein the circuit board is arranged on a side of the angle limiter away from the accommodating cavity, the circuit board is provided with a Hall switch, and a surface of the circuit board facing away from the accommodating cavity is provided with a light emitting member, the light emitting member is electrically connected to the Hall switch; when the supporting plate rotates, the magnetic member approaches or moves away from the Hall switch, so that the Hall switch is turned on or off; the Hall switch is used to control the light emitting member to be powered on or off.

2. The mobile terminal protective holder of claim 1, wherein the bottom of the accommodating cavity is also provided with a battery accommodating groove, a battery is provided in the battery accommodating groove, the battery is electrically connected to the circuit board.

3. The mobile terminal protective holder of claim 1, wherein a back of the shell body is provided with a light-transmitting protective cover, and the light-transmitting protective cover is covered on the circuit board.

4. The mobile terminal protective holder of claim 1, wherein the mobile terminal protective holder further comprises an inner cover plate, the inner cover plate is provided on an inner side of the bottom of the accommodating cavity and is used for plugging the through hole.

5. The mobile terminal protective holder of claim 1, wherein the angle limiter comprises a plurality of limiting bodies provided along a circumferential direction of the supporting plate and connecting arms, each of the connecting arms is connected between corresponding two adjacent limiting bodies of the plurality of limiting bodies; the plurality of limiting bodies are fixedly connected to the shell body, and the connecting arms abut against a circumferential side wall of the supporting plate.

6. The mobile terminal protective holder of claim 5, wherein convex parts are one-to-one disposed on the connecting arms; concave parts matched with the convex parts are disposed on the circumferential side wall of the supporting plate.

7. The mobile terminal protective holder of claim 1, wherein the supporting frame comprises a first supporting plank, the supporting plate is provided with a first accommodating groove for accommodating the first supporting plank, and an end surface of the first supporting plank is flush with an end surface of the supporting plate, and a first end of the first supporting plank is hinged to a side wall of the first accommodating groove.

8. The mobile terminal protective holder of claim 7, wherein a second end of the first supporting plank is provided with a first notch, the side wall of the first accommodating groove is concave inward to form a second notch; and the first supporting plate is provided with a third notch adjacent to the first notch.

9. The mobile terminal protective holder of claim 7, wherein the supporting frame comprises a second supporting plank, and a side of the first supporting plank facing the supporting plate is inwardly concave to form a second accommodating groove; a first end of the second supporting plank is hinged to a side wall of the second accommodating groove and a second end of the second supporting plank is slidably connected to the supporting plate, and an opening direction of the second supporting plank is opposite to an opening direction of the first supporting plank.

plank is hinged to a side wall of the second accommodating groove and a second end of the second supporting plank is slidably connected to the supporting plate, and an opening direction of the second supporting plank is opposite to an opening direction of the first supporting plank.

10. The mobile terminal protective holder of claim 1, wherein the shell body comprises a lower protective cover, an upper protective cover is fastened to the lower protective cover, and the lower protective cover is provided with the through hole.

11. The mobile terminal protective holder of claim 1, wherein a stylus pen installation portion is provided on a back side of the shell body, and a stylus pen is movably arranged in the stylus pen installation portion.

12. The mobile terminal protective holder of claim 1, wherein the supporting plate is also provided with a rope threading hole.

\*   \*   \*   \*   \*